US008429410B2

(12) United States Patent
Little et al.

(10) Patent No.: US 8,429,410 B2
(45) Date of Patent: Apr. 23, 2013

(54) SYSTEM AND METHOD OF INSTALLING SOFTWARE APPLICATIONS ON ELECTRONIC DEVICES

(75) Inventors: Herbert Anthony Little, Waterloo (CA); David Clark, Waterloo (CA); Russell Norman Owen, Waterloo (CA); Scott William Totzke, Waterloo (CA); Neil Patrick Adams, Waterloo (CA); Michael Stephen Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 224 days.

(21) Appl. No.: 12/829,555

(22) Filed: Jul. 2, 2010

(65) Prior Publication Data
US 2010/0275029 A1 Oct. 28, 2010

Related U.S. Application Data

(62) Division of application No. 10/784,024, filed on Feb. 20, 2004, now abandoned.

(60) Provisional application No. 60/448,540, filed on Feb. 21, 2003.

(51) Int. Cl.
*H04L 29/06* (2006.01)

(52) U.S. Cl.
USPC .............................. 713/175; 713/176; 717/174

(58) Field of Classification Search .................. 713/175, 713/176; 717/174
See application file for complete search history.

(56) References Cited

U.S. PATENT DOCUMENTS

| 5,218,701 A | | 6/1993 | Miyazaki |
| 5,560,008 A | * | 9/1996 | Johnson et al. .................... 726/5 |
| 5,619,710 A | | 4/1997 | Travis et al. |
| 5,825,880 A | * | 10/1998 | Sudia et al. .................... 713/180 |

(Continued)

FOREIGN PATENT DOCUMENTS

| CA | 2516580 | 1/2011 |
| CN | 100349087 | 11/2007 |

(Continued)

OTHER PUBLICATIONS

Japanese Notice of Final Rejection. Application No. 2006-500447. Dated: Sep. 16, 2010.

(Continued)

*Primary Examiner* — David Garcia Cervetti
(74) *Attorney, Agent, or Firm* — Bereskin & Parr LLP/S.E.N.C.R.L., s.r.l.

(57) ABSTRACT

In at least one embodiment, there is provided a mobile wireless device comprising: a microprocessor and memory, the memory comprising a set of control settings used to control a plurality of device operations; wherein the microprocessor is configured to: receive a first digital signature key for verifying digital signatures on software applications to be installed on the device; determine if any digital signature keys for verifying digital signatures on software applications to be installed on the device exist on the device, and if not, store the received first digital signature key in the memory; receive a software application for installation on the device; verify a digital signature on the received software application using the first digital signature key; and install the software application on the device if the digital signature on the received software application is successfully verified.

19 Claims, 7 Drawing Sheets

U.S. PATENT DOCUMENTS

| | | | |
|---|---|---|---|
| 5,944,821 A | 8/1999 | Angelo | |
| 6,009,177 A * | 12/1999 | Sudia | 713/191 |
| 6,061,794 A | 5/2000 | Angelo et al. | |
| 6,134,593 A | 10/2000 | Alexander et al. | |
| 6,134,659 A | 10/2000 | Sprong et al. | |
| 6,141,754 A | 10/2000 | Choy | |
| 6,167,521 A * | 12/2000 | Smith et al. | 726/21 |
| 6,216,116 B1 * | 4/2001 | Barkan et al. | 705/76 |
| 6,233,608 B1 | 5/2001 | Laursen et al. | |
| 6,377,692 B1 * | 4/2002 | Takahashi et al. | 380/277 |
| 6,480,961 B2 | 11/2002 | Rajasekharan et al. | |
| 6,526,456 B1 * | 2/2003 | Allan et al. | 719/328 |
| 6,563,800 B1 * | 5/2003 | Salo et al. | 370/264 |
| 6,697,948 B1 * | 2/2004 | Rabin et al. | 726/30 |
| 6,715,085 B2 * | 3/2004 | Foster et al. | 726/27 |
| 6,832,083 B1 * | 12/2004 | Oba et al. | 455/412.1 |
| 6,865,678 B2 * | 3/2005 | Fischer | 713/176 |
| 6,892,307 B1 * | 5/2005 | Wood et al. | 726/8 |
| 6,922,782 B1 | 7/2005 | Spyker et al. | |
| 6,931,379 B1 * | 8/2005 | Sato et al. | 705/50 |
| 6,978,017 B2 * | 12/2005 | Wiener et al. | 380/30 |
| 7,047,560 B2 * | 5/2006 | Fishman et al. | 726/6 |
| 7,096,004 B2 * | 8/2006 | Minear et al. | 455/410 |
| 7,099,663 B2 * | 8/2006 | Lundblade et al. | 455/425 |
| 7,114,179 B1 * | 9/2006 | Ritter et al. | 726/7 |
| 7,137,007 B2 * | 11/2006 | Terao et al. | 713/180 |
| 7,197,125 B1 * | 3/2007 | Prasad et al. | 379/201.02 |
| 7,213,266 B1 * | 5/2007 | Maher et al. | 726/26 |
| 7,234,160 B2 * | 6/2007 | Vogel et al. | 726/10 |
| 7,249,258 B2 * | 7/2007 | Honda et al. | 713/176 |
| 7,296,149 B2 * | 11/2007 | Hiltgen | 713/161 |
| 7,412,480 B2 * | 8/2008 | Baentsch et al. | 709/203 |
| 7,461,249 B1 * | 12/2008 | Pearson et al. | 713/156 |
| 7,496,757 B2 * | 2/2009 | Abbott et al. | 713/176 |
| 7,565,551 B2 * | 7/2009 | Kirovski | 713/189 |
| 7,793,355 B2 | 9/2010 | Little et al. | |
| 7,970,821 B2 * | 6/2011 | Baentsch et al. | 709/203 |
| 8,302,185 B2 | 10/2012 | Little et al. | |
| 2001/0002485 A1 | 5/2001 | Bisbee et al. | |
| 2002/0002703 A1 * | 1/2002 | Baentsch et al. | 717/11 |
| 2002/0007454 A1 * | 1/2002 | Tarpenning et al. | 713/156 |
| 2002/0007455 A1 * | 1/2002 | Wiederin et al. | 713/162 |
| 2002/0026579 A1 * | 2/2002 | Wiederin et al. | 713/162 |
| 2002/0087887 A1 | 7/2002 | Busam et al. | |
| 2002/0116632 A1 * | 8/2002 | Itoh et al. | 713/200 |
| 2002/0120856 A1 | 8/2002 | Schmidt et al. | |
| 2002/0143278 A1 | 10/2002 | Bystrom et al. | |
| 2002/0152376 A1 | 10/2002 | Eigeles | |
| 2002/0184046 A1 * | 12/2002 | Kamada et al. | 705/1 |
| 2002/0184512 A1 * | 12/2002 | Cardoso, Jr. | 713/193 |
| 2003/0005290 A1 * | 1/2003 | Fishman et al. | 713/156 |
| 2003/0053632 A1 * | 3/2003 | Bousis | 380/277 |
| 2003/0060189 A1 * | 3/2003 | Minear et al. | 455/411 |
| 2003/0093698 A1 * | 5/2003 | Challener et al. | 713/200 |
| 2003/0110376 A1 * | 6/2003 | Wiener et al. | 713/158 |
| 2003/0195949 A1 * | 10/2003 | Slivka et al. | 709/219 |
| 2003/0200454 A1 * | 10/2003 | Foster et al. | 713/200 |
| 2004/0024886 A1 * | 2/2004 | Saxena | 709/229 |
| 2004/0039909 A1 * | 2/2004 | Cheng | 713/169 |
| 2004/0039911 A1 | 2/2004 | Oka et al. | |
| 2004/0162989 A1 * | 8/2004 | Kirovski | 713/189 |
| 2004/0203684 A1 * | 10/2004 | Jokinen et al. | 455/418 |
| 2004/0255169 A1 | 12/2004 | Little et al. | |
| 2005/0044544 A1 * | 2/2005 | Slivka et al. | 717/174 |
| 2006/0236111 A1 * | 10/2006 | Bodensj et al. | 713/176 |
| 2006/0272028 A1 | 11/2006 | Maes | |
| 2008/0016332 A1 | 1/2008 | Holden et al. | |
| 2010/0325741 A1 | 12/2010 | Little et al. | |

FOREIGN PATENT DOCUMENTS

| | | |
|---|---|---|
| EP | 0828209 | 3/1998 |
| EP | 1168141 | 1/2002 |
| EP | 1427166 | 8/2004 |
| EP | 1168141 | 8/2007 |
| EP | 2182465 | 5/2010 |
| FR | 2 825 565 | 12/2002 |
| GB | 2 355 819 | 5/2001 |
| GB | 2378780 | 2/2003 |
| HK | 1143223 | 12/2010 |
| JP | 3-176752 | 7/1991 |
| JP | 10-21196 | 1/1998 |
| JP | 2002-56360 | 2/2002 |
| JP | 2002091598 | 3/2002 |
| JP | 2002170063 | 6/2002 |
| JP | 2002182963 | 6/2002 |
| JP | 2002-278937 | 9/2002 |
| WO | 98/50853 | 11/1998 |
| WO | 00/60434 | 10/2000 |
| WO | 0171590 | 9/2001 |
| WO | 01/78395 | 10/2001 |
| WO | 02/097620 | 12/2002 |
| WO | 2004053618 | 6/2004 |

OTHER PUBLICATIONS

Canadian Notice of Allowance. Application No. 2,516,580. Dated: Oct. 14, 2010.

Amendment After Final. Co-pending U.S. Appl. No. 10/732,132. Dated: Dec. 28, 2009.

Advisory Action. Co-pending U.S. Appl. No. 10/732,132. Dated: Jan. 19, 2010.

Notice of Appeal. Co-pending U.S. Appl. No. 10/732,132. Dated: Jan. 28, 2010.

PreBrief Appeal Conference Decision. Co-pending U.S. Appl. No. 10/732,132. Dated: Mar. 23, 2010.

Notice of Allowance. Co-pending U.S. Appl. No. 10/732,132. Dated: May 4, 2010.

Co-pending U.S. Appl. No. 12/869,589, "System and Method of Owner Control of Electronic Devices", filed Aug. 26, 2010.

Co-pending U.S. Appl. No. 10/732,132, "System and Method of Owner Control of Electronic Devices", filed Dec. 10, 2003.

United States Final Office Action. Co-pending U.S. Appl. No. 10/732,132. Dated: Oct. 28, 2009.

Responsive Amendment. Co-pending U.S. Appl. No. 10/732,132. Dated: Jul. 1, 2009.

United States Office Action. Co-pending U.S. Appl. No. 10/732,132. Dated: Apr. 2, 2009.

United States Final Office Action. Co-pending U.S. Appl. No. 10/732,132. Dated: Sep. 23, 2008.

Responsive Amendment. Co-pending U.S. Appl. No. 10/732,132. Dated: Jul. 22, 2008.

United States Office Action. U.S. Appl. No. 10/732,132. Dated: Jun. 11, 2007.

European Summons to Attend Oral Proceedings Pursuant to Rule 115(1) EPC. Application No. 04712985.3. Dated: Nov. 4, 2009.

Takaragi. "Angou Houshiki to Ouyou [Encryption System and Application]", Journal of Information Processing, vol. 32, No. 6, Japan: Information Processing Society of Japan. Jun. 1991, vol. 32, pp. 714-723.

European Examination Report. Application No. 04712985.3. Dated: Apr. 16, 2009.

Australian Examination Report. Application No. 2004213886. Dated: Feb. 6, 2009.

Stanford Windows Infrastructure, "Securing Your Windows Files: Introduction to Securing Your Windows Computer Files", (retrieved on Feb. 4, 2009) retrieved from the internet <http://windows.stanford.edu/docs/IntroSecurity.htm> published on Aug. 22, 2001.

Request for Continued Examination (RCE). Co-pending U.S. Appl. No. 10/732,132. Dated: Jan. 22, 2009.

Responsive Amendment. Co-pending U.S. Appl. No. 10/732,132. Dated: Jan. 22, 2009.

Advisory Action. Co-pending U.S. Appl. No. 10/732,132. Dated: Dec. 8, 2008.

Responsive Amendment. Co-pending U.S. Appl. No. 10/732,132. Dated: Nov. 24, 2008.

United States Office Action. Co-pending U.S. Appl. No. 10/732,132. Dated: Feb. 22, 2008.

Responsive Amendment. Co-pending U.S. Appl. No. 10/732,132. Dated: Dec. 14, 2007.

Japanese First Office Action (English translation). Application No. 2006-500447. Date of Mailing: May 1, 2009.

Australian Examination Report. Application No. 2004213886. Dated: Sep. 30, 2008.
Chinese Notification of Completion of Formalities for Registration (English translation) and Chinese Notification of Grant of Invention Patent (English translation). Application No. 200480006694.4. Dated: Jun. 29, 2007.
European Examination Report. Application No. 04712985.3. Dated: Apr. 11, 2007.
European Examination Report. Application No. 04712985.3. Dated: Jul. 6, 2007.
European Summons to Attend Oral Proceedings pursuant to Rule 115(1) EPC. Application No. 04712985.3. Dated: Dec. 19, 2008.
Korean Notice of Decision for Patent. Application No. 10-2005-7015431. Dated: Oct. 31, 2006.
Australian Exam Report. Application No. 2004213886. Dated: May 10, 2007.
International Search Report and the Written Opinion of the International Searching Authority, or the Declaration of Application No. PCT/CA2004/000250 of Feb. 20, 2004—12 pgs.
European Search Report. Application No. 04712985.3. Dated: Dec. 22, 2006.
Chinese Search Report (Informal Translation). Application No. 2004800066944. Dated: Dec. 8, 2008.
Indian First Office Action. Application No. 3755/DELNP/2005. Dated: Mar. 9, 2010.
Canadian First Office Action. Application No. 2,516,580. Dated: Apr. 6, 2009.
Notice of Appeal Filed. Co-pending U.S. Appl. No. 10/732,132, Dated: Jan. 28, 2010
Pre-Brief Appeal Conference Decision. Co-pending U.S. Appl. No. 10/732,132. Dated: Mar. 23, 2010.
European Search and Exam Report. Application No. 10152854.5. Dated: Jul. 13, 2010.
Third Examination Report. Australian Patent Application No. 2009200467. Dated: Jul. 4, 2011.
First Examination Report. Australian Patent Application No. 2009200467. Dated: Jan. 13, 2011.
Second Examination Report. Australian Patent Application No. 2009200467. Dated: Mar. 22, 2011.
Preliminary Amendment. U.S. Appl. No. 12/869,589. Dated: Feb. 14, 2011.
Response. European Patent Application No. 04712985.3. Dated: Mar. 15, 2007.
Invitation pursuant to Article 96(2) and Rule 51(2) EPC. European Patent Application No. 04712985.3. Dated: Nov. 4, 2007.
Response. European Patent Application No. 04712985.3. Dated: May 8, 2007.
Response. European Patent Application No. 04712985.3. Dated: Jan. 4, 2008.
Response. European Patent Application No. 04712985.3. Dated: Mar. 23, 2009.
Response. European Patent Application No. 04712985.3. Dated: Aug. 18, 2009.
Response. European Patent Application No. 04712985.3. Dated: Jan. 11, 2010.
Acknowledgement of withdrawal of the European patent application. European Patent Application No. 04712985.3. Dated: Feb. 11, 2010.
Response. European Patent Application No. 10152854.5. Dated: Sep. 27, 2010.
Exam Report. European Patent Application No. 10152854.5. Dated: Mar. 12, 2012.
Response. European Patent Application No. 10152854.5. Dated: Jul. 2, 2012.
Singapore Certificate of Grant. Singapore Patent Application No. 201001768-9. Dated: Jan. 31, 2012.
Office Action. Co-pending U.S. Appl. No. 12/869,589. Dated: Aug. 3, 2011.
Response. Co-pending U.S. Appl. No. 12/869,589. Dated: Mar. 11, 2011.
Office Action. Co-pending U.S. Appl. No. 12/869,589. Dated: Jan. 19, 2012.
Response. Co-pending U.S. Appl. No. 12/869,589. Dated: Apr. 16, 2012.
Terminal Disclaimer. Co-pending U.S. Appl. No. 12/869,589. Dated: May 31, 2012.
Notice of Allowance. Co-pending U.S. Appl. No. 12/869,589. Dated: Jun. 13, 2012.
Communication under Rule 71(3) EPC. European Patent Application No. 10152854.5. Dated Oct. 4, 2012.
Co-pending U.S. Appl. No. 13/606,814, filed Sep. 7, 2012.

* cited by examiner

SYSTEM AND METHOD OF INSTALLING SOFTWARE APPLICATIONS ON ELECTRONIC DEVICES

CROSS-REFERENCE TO RELATED APPLICATIONS

This application is a continuation of U.S. patent application Ser. No. 10/784,024, filed Feb. 20, 2004, which claims the benefit of U.S. Provisional Patent Application No. 60/448,540, filed Feb. 21, 2003; the contents of both applications are hereby incorporated by reference.

BACKGROUND

This application relates generally to electronic devices, and in particular to controlling operations of such devices by multiple entities, who may be different from a device user.

In a corporate environment, employees are often provided with access to office supplies and equipment to be used in performing job functions. Standard equipment typically includes at least a personal computer (PC), and may also include wireless mobile communication devices and other types of electronic devices. Although such equipment is intended primarily for business- or work-related purposes, users sometimes make personal use of office equipment. Employers are usually comfortable with some degree of personal use of such equipment, provided that the personal use does not interfere with normal job functions, does not incur additional costs, and conforms with company policies.

In these types of situations, a user of an electronic device is not the owner of the device, and the user and owner may have different perceptions of acceptable device uses. Acceptable use may be specified in company policies, for example, which employees are expected to follow, but a corporate device owner often has little if any control over how electronic devices are ultimately used. According to one known scheme for controlling operation of electronic devices, an owner loads a policy file onto a device to restrict the type of operations or software applications that may be executed by the device. However, this type of scheme is sometimes circumvented by a user by either deleting the owner policy file or replacing the owner policy file with a user policy file which may include fewer restrictions than the owner policy file. In addition, particularly in large organizations, more than one entity may have usage policies that they wish to manage and enforce. Known electronic device control schemes do not provide for multiple-level device control.

Therefore, there remains a need for a system and method of multiple-level control of electronic devices.

SUMMARY

A system of multiple-level control of an electronic device comprises an authorization information store configured to store authorization information comprising data integrity and authentication information for each of a plurality of authorization levels, a controlled information store configured to store controlled information for controlling operation of the electronic device, and an insertion module configured to receive controlled information associated with one of the plurality of authorization levels from a source, to check the integrity of the received controlled information and determine whether the source is a party authorized at the one of the plurality of authorization levels based on the data integrity and authentication information for the one of the plurality of authorization levels, and to store the received controlled information to the controlled information store where the integrity of the received controlled information is verified and the source is a party authorized at the one of the plurality of authorization levels.

A method of multiple-level control of electronic devices comprises the steps of storing authorization information comprising data integrity and authentication information for each of a plurality of authorization levels on an electronic device, receiving controlled information associated with one of the plurality of authorization levels at the electronic device from a source, checking the integrity of the received controlled information and determining whether the source is a party authorized at the one of the plurality of authorization levels based on the data integrity and authentication information for the one of the plurality of authorization levels, and storing the received controlled information on the electronic device where the integrity of the received controlled information is verified and the source is a party authorized at the one of the plurality of authorization levels.

This method is not limited to the order of steps or segregation of steps described above; rather, the aggregation of steps, or portions thereof, into a single step, or multiple other steps, or the reordering of such original steps or aggregations are specifically contemplated. In addition, one or more of the described steps may be stored as computer executable instructions in and/or on any suitable combination of computer-readable media. Instead of, or in addition to stored instructions, one or more steps, or portions thereof, may be executed by special purpose hardware designed to perform such steps.

Further features of electronic device control systems and methods will be described or will become apparent in the course of the following detailed description.

DETAILED DESCRIPTION

Figure 1:
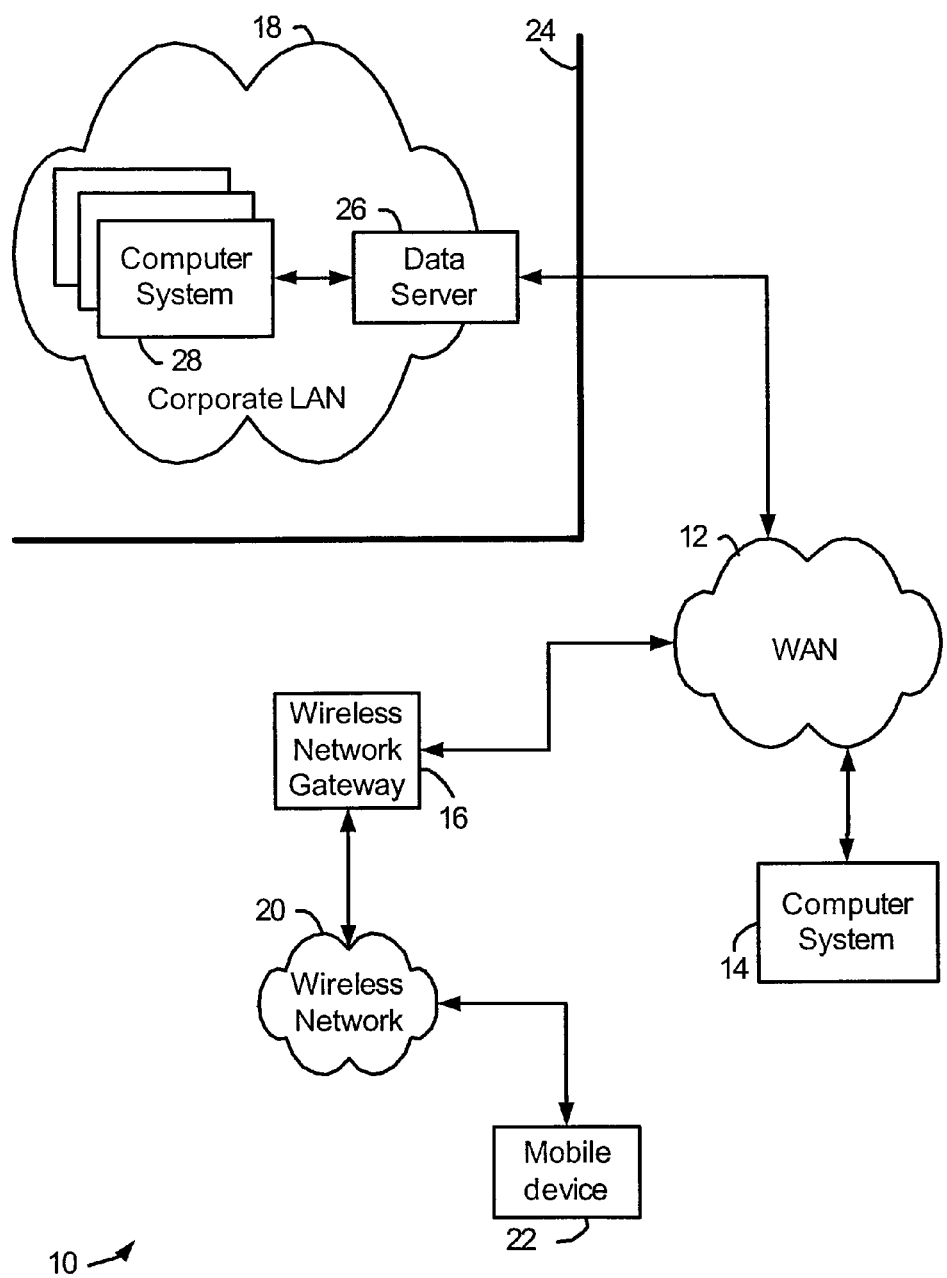
FIG. 1 is a block diagram showing a communication system in which electronic devices are used.

FIG. 1 is a block diagram showing a communication system in which electronic devices are used. The communication system 10 includes a Wide Area Network (WAN) 12, coupled to a computer system 14, a wireless network gateway 16, and a corporate Local Area Network (LAN) 18. The wireless network gateway 16 is also connected to a wireless communication network 20 in which a wireless mobile communication device 22 ("mobile device"), is configured to operate.

The computer system 14 is a desktop or laptop PC, which is configured to communicate to the WAN 12, the Internet for example. A PC such as the computer system 14 normally accesses the Internet through an Internet Service Provider (ISP), Application Service Provider (ASP) or the like.

The corporate LAN 18 is an example of a typical working environment, in which multiple computers 28 are connected in a network. It is normally located behind a security firewall 24. Within the corporate LAN 18, a data server 26, operating on a computer behind the firewall 24, acts as the primary interface for the corporation to exchange data both within the LAN 18, and with other external systems via the WAN 12. One type of data server commonly used in corporate networks like the LAN 18 is a message server. Known message servers include, for example, Microsoft™ Exchange Server and Lotus Domino™. Where the data server 26 is a message server, each of the computer systems 28 in the LAN 18 implements a messaging client, such as Microsoft Outlook™, Lotus Notes™, etc. In this case, messages received by the message server are distributed to mailboxes for user accounts addressed in the received messages, and are then accessed by a user through a messaging client operating on a computer system 28.

Although only a data server 26 is shown in the LAN 18, those skilled in the art will appreciate that a LAN may include other types of servers supporting resources that are shared between the networked computer systems 28. Similarly, a single data server 26 may provide multiple functions, such as electronic messaging, dynamic database storage for data like calendars, todo lists, task lists, e-mail and documentation. Electronic device control systems and methods as described herein are applicable to a wide range of electronic devices and functions.

The wireless network gateway 16 provides an interface to a wireless network 20, through which data is exchanged with the mobile device 22. Such functions as addressing of the mobile device 22, encoding or otherwise transforming messages for wireless transmission, and any other interface functions are performed by the wireless network gateway 16. The wireless network gateway 16 may be configured to operate with more than one wireless network 20, in which case it also determines a most likely network for locating the mobile device 22 and possibly tracks mobile devices as users roam between countries or networks.

The mobile device 22 is, for example, a data communication device, a voice communication device, a dual-mode communication device such as a mobile telephone having both data and voice communications functionality, a multiple-mode device capable of voice, data and other types of communications, a personal digital assistant (PDA) enabled for wireless communications, or a wireless modem which operates in conjunction with a laptop or desktop computer system.

Any computer system with access to the WAN 12 may exchange messages with the mobile device 22 through the wireless network gateway 16. Alternatively, private wireless network gateways such as wireless Virtual Private Network (VPN) routers could be implemented to provide a private interface to a wireless network. A wireless VPN router implemented in the LAN 18 provides a private interface from the LAN 18 to one or more mobile devices such as 22 through the wireless network 20. A private interface to the mobile device 22 may also effectively be extended to entities outside the LAN 18 by providing a forwarding or redirection system that operates with the data server 26. Such a redirection system is disclosed in U.S. Pat. No. 6,219,694, which is hereby incorporated into this application by reference. In this type of system, incoming data items received by the data server 26 and addressed to a user of a mobile device 22 are sent through the wireless network interface, either a wireless VPN router, the wireless gateway 16, or some other interface, to the wireless network 20 and to the user's mobile device 22. Another alternate interface to the data server 26 is a Wireless Application Protocol (WAP) gateway. In the above example of the data server 26 being a message server, a list of messages in a user's mailbox on a message server, and possibly each message or a portion of each message, may be sent to the mobile device 22 through a WAP gateway.

A wireless network 20 normally communicates with devices such as the mobile device 22 via RF transmissions between base stations and devices. The wireless network 20 may be, for example, a data-centric wireless network, a voice-centric wireless network, or a dual-mode network that supports both voice and data communications over the same infrastructure. Recently developed dual-mode networks include Code Division Multiple Access (CDMA) networks and General Packet Radio Service (GPRS) networks. So-called third-generation (3G) networks like Enhanced Data rates for Global Evolution (EDGE) and Universal Mobile Telecommunications Systems (UMTS) are currently under development. Older data-centric networks include, but are not limited to, the Mobitex™ Radio Network ("Mobitex"), and the DataTAC™ Radio Network ("DataTAC"). Voice-centric data networks such as Personal Communication System (PCS) networks, including Global System for Mobile Communications (GSM) and Time Division Multiple Access (TDMA) systems, have been available in North America and world-wide for several years.

In the system 10, a company which owns the corporate LAN 18 may provide a computer system 28 and a mobile device 22 to an employee. Where a computer system 28 issued to an employee is a laptop computer, for example, it could be used either within or outside the corporate LAN 18. When the computer system 28 is operating within the LAN 18, non-local operations may be restricted by configuring network permissions and restrictions for the computer system 28, a network account of the user, or both, in such a way that they cannot be changed by the user. However, if a user is using a computer system outside the LAN 28, by connecting the computer system to the WAN 12 as shown at 14, for example, network-based controls in place at the LAN 18 can sometimes be bypassed.

An owner may instead establish local settings directly on an electronic device such as a computer system or a mobile device to maintain control over the device. Such local settings control device operations, but only as long as the settings remain intact on the device. This type of control mechanism is prone to being circumvented by replacing or deleting local settings on the device.

In order to prevent a user from deleting, modifying, or replacing local control settings or other information that affects operation of an electronic device, referred to hereinafter primarily as controlled information, operations involving controlled information could be restricted to an authorized party. In a corporate environment, one or more network administrators or accounts would normally be authorized to manage corporate control policies on a single level basis. However, this type of device control management is not feasible in certain types of organization. For example, in large organizations, "global" control policies relating to certain types of operations or usage might be desired for all electronic devices associated with the organization, whereas custom control policies for other types of operation might not be common for all devices. Employees in one corporate office may require access to functions that are not available or not commonly used in other corporate offices in different countries or regions, for instance. In this case, every party authorized to establish and change controlled information must be made aware of and trusted to follow both global and custom control policies. Distribution of changes to global control policies thus becomes a further challenge in this type of device control management.

A multiple-level system and method of controlling electronic devices reduces the reliance on a single authorized party or group of similarly-authorized parties for management of electronic device control. According to aspects described herein, multiple levels of authorization provide for control of particular electronic device functions or types of function by different authorized parties. In the above example of a large corporation having offices in which different control policies are desired, first and second authorization levels could be created to manage global control policies and custom control policies, respectively. Network administrators in each corporate office could be authorized at the second level, and one or more senior administrators or managers, at corporate headquarters, for example, could be authorized at the first level.

Such multiple-level control also permits division of control functions dependent upon other criteria than breadth of use. For example, although any corporate network administrator may be trusted to manage electronic device control settings such as a minimum password length or maximum password age, tighter control over installed software applications may be desired. In this case, software installation control may be entrusted to an administrator at a first authorization level, while other control functions may be entrusted to parties authorized at a second authorization level. It should also be apparent that further authorization levels may also be established. A completely trusted primary or master authorization level at which authorized parties have permissions to establish or modify any controlled information provides a mechanism to override other authorization levels, as described in further detail below. Hierarchical authorization levels, peer authorization levels, or both, are possible. In the above example of a first authorization level for software application installation control and a second authorization level for other control functions, the first and second levels are peer levels, in that authorization of a party at one of the levels does not enable the party to perform operations requiring authorization at the other level. Where a master authorization level is also provided, a hierarchical structure results, with the first and second authorization levels being subordinate to the master authorization level.

Figure 2:
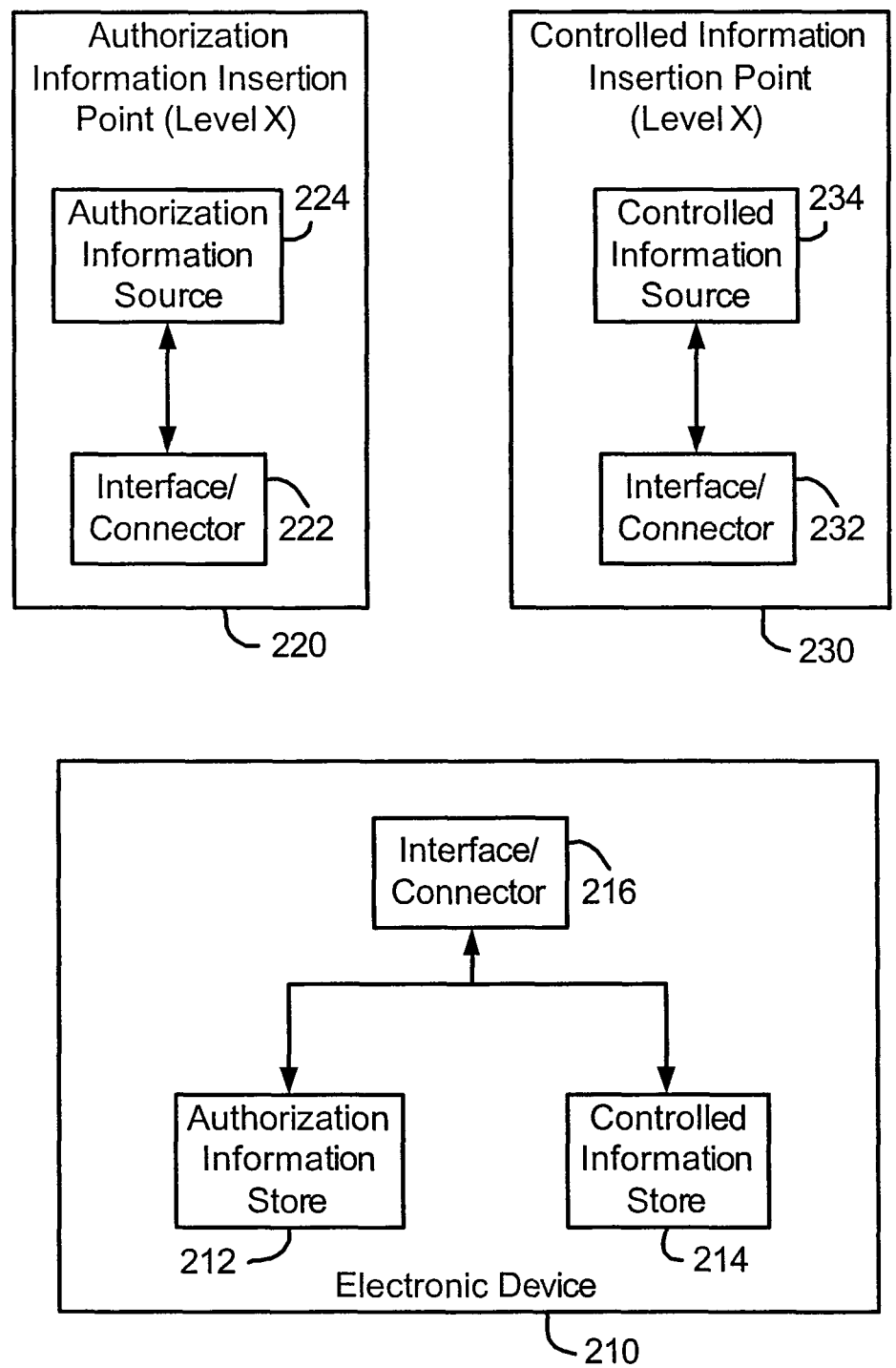
FIG. 2 is a block diagram illustrating a system of inserting authorization information and controlled information onto an electronic device.

FIG. 2 is a block diagram illustrating a system of inserting authorization information and controlled information onto an electronic device. The system in FIG. 2 includes an electronic device 210, an authorization information insertion point 220 for an authorization level X, and a controlled information insertion point 230 for the authorization level X. An authorization information store 212, a controlled information store 214, and an interface/connector 216 are provided in the electronic device 210. The authorization information insertion point 220 includes an authorization information source 224 and an interface/connector 222. The controlled information insertion point 230 similarly includes a controlled information source 234 and an interface/connector 232.

The authorization information store 212 stores information, such as a signature public key or other data integrity or authentication information, for example. Authorization information in the store 212 is used to determine whether received controlled information was approved or sent to the electronic device 210 by an authorized party, as described in further detail below. The controlled information store 214 stores controlled information which affects the operation of the electronic device 210. The sources 224 and 234 are, for example, local memory devices, readers such as disk drives or memory card readers for reading authorization information and controlled information from removable storage media, communication modules through which remote memory devices storing authorization information and controlled information are accessible, or user interfaces through which authorization information and controlled information are entered.

The interface/connector 222 is compatible with the interface/connector 216 to establish a communication link between the authorization information insertion point 220 and the electronic device 210, to thereby enable authorization information to be transferred to the electronic device 210 from the authorization information source 224. The interface/connector 232 similarly enables transfer of controlled information from the controlled information source 234 onto the electronic device 210 via a communication link established between the interface/connectors 232 and 216. The interface/connectors 216, 222, and 232 establish wired communication links, where the interface/connectors are serial ports, for example, or wireless communication links such as infrared links where the interface/connectors are infrared modules. Authorization information and controlled information transferred to the electronic device 210 are respectively inserted or stored in the authorization information store 212 and the controlled information store 214.

The authorization information insertion point 220 is associated with a party authorized at authorization level X for controlling the electronic device 210. Where the electronic device 210 is provided to a user by an employer, for example, the authorization information insertion point 220 may be a computer system or device controlled by a corporate computer system administrator or IT department. The authorization level X is created on the electronic device 210 by establishing a communication link between the authorization information insertion point 220 and the electronic device 210 through the interface/connectors 222 and 216 and then inserting authorization information for authorization level X into the authorization information store 212. As described in further detail below, once authorization information for level X has been inserted onto the electronic device 210, only a party authorized at authorization level X, or a higher hierarchical authorization level if any exist, is able to insert or change authorization information for authorization level X or control device features or usage associated with authorization level X.

Controlled information, as described above, may include control settings, software applications, and other information that affects operation of the electronic device 210. Control settings specify values or configurations according to usage policies to be enforced at the electronic device 210. For example, control settings might specify a minimum password length and a maximum password age, and that password protection must be enabled. Where these features are associated with a particular authorization level X, then authorization level X has control settings which are inserted onto the electronic device 210. On the same electronic device 210, software application installation control might be associated with a different authorization level Y and based on digital signatures. Since digital signature-based software application installation control requires only a signature key for verifying digital signatures on received software applications, authorization information for authorization level Y, including such a signature key, is inserted onto the electronic device 210, but no control settings are required for authorization level Y. In this case, the authorization information store 212 stores authorization information for authorization levels X and Y, whereas the controlled information store 214 stores control settings only for authorization level X. For authorization level Y, a subsequently received digitally signed software application comprises controlled information which is stored to the controlled information store, provided its digital signal is verified, as described in further detail below.

Insertion of controlled information associated with an authorization level onto an electronic device is restricted once authorization information for that authorization level has been inserted onto the electronic device. Thus, the controlled information insertion point 230 need not necessarily be controlled by a party authorized at authorization level X. Where a corporate owner of the electronic device 210 maintains control over the controlled information insertion point 230, the insertion points 220 and 230 may be implemented in the same computer system or device and share the same interface/connector. However, separate insertion points 220 and 230 as shown in FIG. 2 allow an owner of the electronic device 210 or a party authorized at the authorization level X to delegate controlled information insertion to any other party that either is authorized at the same authorization level X or has access to controlled information authorized by such a party. If controlled information insertion is controlled using digital signatures, for example, as described in further detail below, authorization information for the authorization level X, including a signature key, is inserted onto the electronic device 210 by a party authorized at authorization level X. Only digitally signed controlled information for which a digital signature is verified using the signature key can then be inserted onto the electronic device 210. In this case, authorization information is inserted by an authorized party, but the controlled information insertion point 230 could be the user's computer system, where digitally signed controlled information for authorization level X is provided to the user by an authorized party. The user then inserts the digitally signed controlled information onto the electronic device 210. Even though the user inserts the digitally signed controlled information in this example, the controlled information is established and signed by an authorized party, not by the user.

In most implementations, the authorization information insertion point 220 and the controlled information insertion point 230 include the same type of interface/connectors 222 and 232, compatible with the interface/connector 216 in the electronic device 210. However, the electronic device 210 may alternatively include multiple interface/connectors, such that different types of interface/connector may be implemented at the authorization information insertion point 220 and the controlled information insertion point 230. Although only a single authorization information insertion point 220 and controlled information insertion point 230 are shown in FIG. 2, a complete insertion system may include more than one of each type of insertion point. In a large company, for example, corporate computer system administrators may be authorized to perform authorization information insertion operations from administrator computer systems, or from any corporate computer system from which administrative functions can be accessed, thereby providing multiple authorization information insertion points 220. Similarly, when users insert digitally signed controlled information onto electronic devices, as described above, each user's computer system is used as a controlled information insertion point 230.

Figure 3:
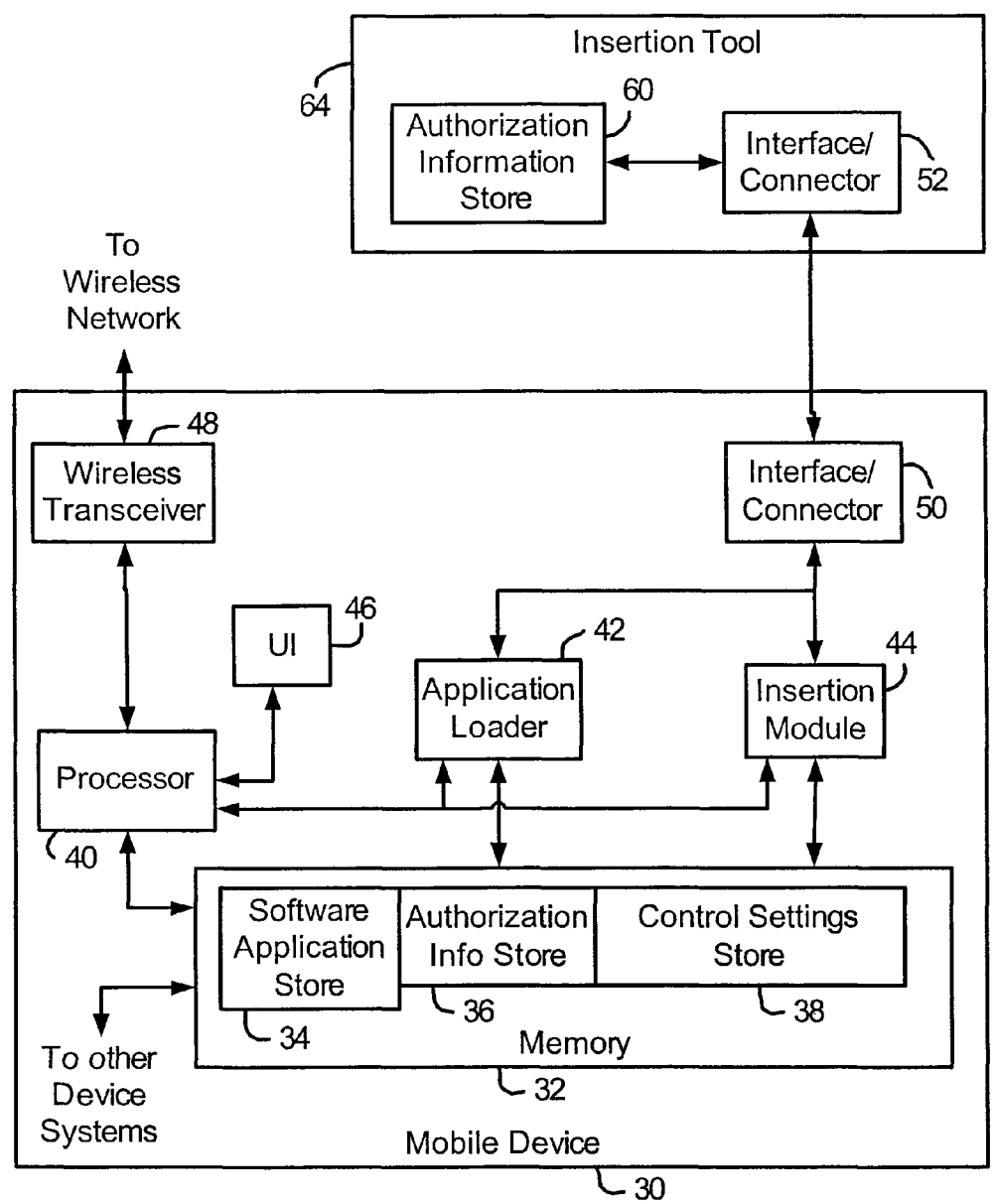
FIG. 3 is a block diagram of an electronic device in which a system and method of multiple-level control are implemented.

FIG. 3 is a block diagram of an electronic device in which a system and method of multiple-level control are implemented. In FIG. 3, the electronic device is a mobile device 30 adapted to operate within a wireless network. Also shown in FIG. 3 is an insertion tool 64 used to insert authorization information onto the mobile device 30.

It should be apparent to those skilled in the art that only the components involved in a device control system are shown in FIG. 3. A mobile device typically includes further components in addition to those shown in FIG. 3. Also, the mobile device 30 is an illustrative example of an electronic device for which some sort of usage control policy is desirable. Multiple-level control is also applicable to other types of electronic devices, such as mobile telephones, PDAs, and personal computers, for example.

The mobile device 30 comprises a memory 32, a processor 40, an application loader 42, an insertion module 44, a user interface (UI) 46, a wireless transceiver 48, and an interface or connector 50. The memory 32 preferably includes a storage area 34 for software applications, an authorization information store 36, a control settings store 38, as well as possibly other data stores associated with other device systems in addition to those shown in FIG. 3.

The memory 32 is a writeable store such as a RAM or Flash memory into which other device components may write data. However, write and erase access to the software application store 34, the authorization information store 36, and the control settings store 38 is preferably restricted. For example, a user of the mobile device 30 may be able to retrieve data from the stores 34, 36, and 38, but write and erase operations for these stores are controlled, as described below.

The software application store 34 includes software applications that have been installed on the mobile device 30, and may include, for example, an electronic messaging application, a personal information management (PIM) application, games, as well as other applications. The authorization information store 36 stores authorization information which is used to verify that received controlled information originated with or was at least approved by a properly authorized party. Other information, including information to identify an owner of the mobile device 30 or authorized parties for authorization levels or data integrity check information, for example, may also be stored in the authorization information store 36. Control settings, in which such controls as usage permissions and restrictions for the mobile device 30 may be specified, are stored in the control settings store 38.

The processor 40 is connected to the wireless transceiver 48 and thus enables the mobile device 30 for communications via a wireless network. The application loader 42 and the insertion module 44, described in further detail below, are connected to the interface/connector 50 to allow communication with the insertion tool 64, through the cooperating interface/connector 52. The application loader 42 and the insertion module 44 are also connected to the processor 40 to provide a further communication path for receiving authorization information and controlled information.

The UI 46 includes one or more UI components, such as a keyboard or keypad, a display, or other components which accept inputs from or provide outputs to a user of the mobile device 30. Although shown as a single block in FIG. 3, it should be apparent that a mobile device 30 typically includes more than one UI, and the UI 46 is therefore intended to represent one or more user interfaces.

The insertion tool 64 includes an authorization information store 60 and an interface/connector 52 through which information is exchanged with the mobile device 30, and thus represents an authorization information insertion point 220 (FIG. 2). As described above, an authorization information insertion point such as the insertion tool 64 is normally controlled by an owner of an electronic device. Therefore, the insertion tool 64 is preferably implemented on an administrator computer system used by an authorized administrator to enable services for or otherwise configure the mobile device 30. Since networked computer systems can typically be used by any user, the insertion tool 64 may instead be accessible to any computer system in a corporate network, dependent upon the particular user that is currently "logged on" the computer system. In such a system, an insertion tool may be used to insert authorization information for more than one authorization level. The authorization information accessed in the authorization store 60 is then dependent upon the particular authorization level for which authorization information is being inserted onto the mobile device 30. Different particular physical authorization information stores could instead be accessed based on authorization level. Alternatively, a separate insertion tool may be implemented for each authorized party or authorization level.

The authorization information store 60 stores authorization information to be inserted onto the mobile device 30, and may be implemented, for example, on a local memory component such as a RAM chip, a Flash memory device, or a hard disk drive. When the insertion tool 64 is implemented in a networked computer system or other network-connected device, the authorization information store 60 may be a remote memory system such as a file server that is accessible to the insertion tool 64 through a network connection. The authorization information store 60 may instead incorporate a memory reader such as a smart card reader, a memory card reader, a Secure Digital (SD) port, a floppy disk drive, or a CD or DVD drive, for example.

Authorization information is transferred between the insertion tool 64 and the mobile device 30 via a communication link established between the interface/connectors 50 and 52. The interface/connectors 50 and 52 could be any of a plurality of compatible data transfer components, including, for example, optical data transfer interfaces such as Infrared Data Association (IrDA) ports, other short-range wireless communications interfaces, or wired interfaces such as serial or Universal Serial Bus (USB) ports and connections. Known short-range wireless communications interfaces include, for example, "Bluetooth" modules and 802.11 modules according to the Bluetooth or 802.11 specifications, respectively. It will be apparent to those skilled in the art that Bluetooth and 802.11 denote sets of specifications, available from the Institute of Electrical and Electronics Engineers (IEEE), relating to wireless LANs and wireless personal area networks, respectively. Therefore, a communication link between the insertion tool 64 and the mobile device 30 may be a wireless connection or a physical wired connection.

Since communications between the insertion tool 64 and the mobile device 30 are not necessarily via a physical connection, references to connecting a mobile device to an insertion tool includes establishing communications through either physical connections or wireless transfer schemes. Thus, the mobile device 30 could be connected to the insertion tool 64 by connecting serial ports on the mobile device 30 and the insertion tool 64, by positioning the mobile device 30 such that an optical port thereof is in a line of sight of a similar port of the insertion tool 64, or by connecting or arranging the mobile device 30 and the insertion tool 64 in some other manner so that data may be exchanged. The particular operations involved in establishing communications between a mobile device and an insertion tool are dependent upon the types of interfaces and/or connectors available in both the mobile device and the insertion tool.

Authorization information is preferably either pre-loaded onto the mobile device 30 before the mobile device 30 is provided to a user, or before the mobile device 30 is configured for use. In the former example, the user does not have physical control of the mobile device 30 until authorization information has been loaded, and thus at least one authorization level has been created on the mobile device 30, whereas in the latter example, the user has possession of the mobile device 30 but is unable to make use of the device until it is configured by, or under the control of, at least one authorized party.

When the mobile device 30 has been connected to the insertion tool 64, authorization information is retrieved from the authorization information store 60 and transferred to the mobile device 30 through the interface/connectors 52 and 50, and passed to the insertion module 44 on the mobile device 30, which stores the authorization information to the authorization information store 36 in the memory 32.

Although the insertion module 44 is shown in FIG. 3 as being connected to the interface/connector 50, this module is preferably implemented as a software module or application that is executed by the processor 40. As such, data transfers to and from the interface/connector 50 may actually be accomplished by routing data through the processor 40 to the interface/connector 50. In this case, the processor 40 is instructed by the insertion tool 64 to start the insertion module 44 before the authorization information is transferred to the mobile device 30. Alternatively, the processor 40 may be configured to start the insertion module 44 whenever authorization information is received. The insertion tool 64 may similarly be a software module or application that is executed by a processor in a computer system or device on which the insertion tool 64 operates.

The authorization information that is pre-loaded onto the mobile device 30 preferably includes at least data integrity and source authentication information, such as a digital signature public key which corresponds to a digital signature private key used by parties authorized at a particular authorization level to digitally sign information before it is transferred to the mobile device 30. Pre-loading of authorization information enables greater security of device control operations, as described in further detail below in the context of digital signatures.

In a device control scheme using digital signatures to verify data integrity and authenticate a source of data, if a digital signature public key for an authorization level has been inserted into the authorization information store 36 on the mobile device 30, controlled information associated with that authorization level may then be inserted onto the mobile device 30. For example, a controlled information insertion tool configured for use with the mobile device 30 is similar to the insertion tool 64, including a controlled information store and an interface/connector compatible with the interface/connector 50. A list of software applications that a user is authorized to install on the mobile device 30, a list of required software applications that must be installed on the mobile device 30, or device configuration settings, for example, may be specified when the controlled information includes control settings. As described above, control settings represent one possible means for controlling operation of an electronic device. An authorization level may or may not have associated control settings.

Controlled information is received by the mobile device 30 from either an insertion tool or another source, over the interface/connector 50, the wireless transceiver 48, or any other available communication subsystem or component. For example, initial control settings might be inserted onto the mobile device using an insertion tool with an interface compatible with the interface/connector 50, whereas software applications or updated control settings may be received over a wireless network.

In order to prevent a user from inserting false control settings or other controlled information to thereby circumvent device controls, controlled information is preferably digitally signed using a digital signature private key associated with the appropriate authorization level before being transferred to the mobile device 30. The insertion module 44 is configured to verify the digital signature before the controlled information is stored on the mobile device 30. If digital signature verification fails, then the controlled information is not stored on the mobile device 30.

Digital signature schemes generally involve some sort of transformation of information to provide for checking the integrity of the information and authentication of a source of the signed information. According to one known digital signature technique, a digest of information to be digitally signed is generated using a non-reversible digest algorithm or transformation, such as the Secure Hashing Algorithm 1 (SHA-1) or the Message-Digest algorithm 5 (MD5). The digest is then further transformed using a digital signature private key and a signature algorithm to generate a digital signature. A digital signature public key corresponding to the private key is used to verify the digital signature.

In the context of controlled information, insertion of a digital signature public key for an authorization level onto the mobile device 30 as part of the authorization information provides for digital signature-based security of controlled information. Controlled information is digitally signed before transfer to the mobile device 30, and the insertion module 44 then verifies that the controlled information was signed using the digital signature private key for the corresponding authorization level, known only to parties authorized at that authorization level, and that the controlled information was not changed after being signed, before it is stored on the mobile device 30. Thus, only controlled information that originates with, or is at least signed by, an appropriately authorized party is stored and used on the mobile device 30. Properly signed controlled information in the form of control settings is stored to the control settings store 38. Other types of properly signed controlled information are similarly processed and stored in the control settings store 38, the software application store 34, or possibly other stores on the mobile device 30.

Controlled information is established based on a set of functions that an authorized party wishes to control on an electronic device, and tends to change relatively infrequently once established. Such controlled information is digitally signed by a secure computer system or software component to which only parties authorized at a particular authorization level have access, using the digital signature private key of the authorization level. Signed controlled information is then stored at a location that is accessible to administrator computer systems and possibly other computer systems, and retrieved as required.

A controlled information insertion tool then transfers the signed controlled information to the mobile device 30. Depending upon how often controlled information changes or is expected to change, the signed controlled information may be further distributed to each computer system in a network in order to provide local access to signed controlled information. When new controlled information is generated and signed, the signed new controlled information preferably replaces any existing copies of the controlled information, as described in further detail below. Wide distribution of controlled information provides easier access to the controlled information, whereas shared remote storage of controlled information requires fewer updates when new controlled information is established.

It is also possible to support digital signature generation for controlled information on a controlled information insertion tool. However, this requires that the controlled information insertion tool has access to the digital signature private key for at least one authorization level. Digital signing of controlled information only by authorized parties is generally preferred in that it limits access to digital signature private keys.

When signed controlled information is transferred to the insertion module 44, or the application loader 42 in the case of a software application, digital signature verification operations are performed. If the digital signature is verified, then the controlled information is stored on the mobile device 30 in the control settings store 38 or the software applications store 34. For a software application, any required installation operations are also preferably executed when a digital signature is verified. Where digital signature verification fails, the controlled information is not stored. In this case, an error or like indication may be output to a user on a UI 46 such as a display, and an error message may be returned to the source of the controlled information, and retry or other error processing operations may be performed at the controlled information source, the mobile device 30, or both.

Given the importance of the digital signature key, at least a first authorization information insertion operation for any authorization level is preferably performed by a party authorized at that authorization level, in order to ensure that only authorized controlled information can subsequently be inserted onto the mobile device 30. This prevents a user from circumventing device control by inserting a digital signature key other than the digital signature key for an authorization level onto the mobile device 30.

When controlled information changes, where an owner wishes to expand or further restrict the use of an electronic device or provide a new software application, for example, the new controlled information is added to or replaces existing controlled information, provided that the controlled information is inserted or approved by a party authorized at the required authorization level. For example, an existing version of control settings is preferably replaced when new control settings for the same authorization level are established and inserted onto an electronic device. Similarly, a new version of a software application preferably replaces an existing version of the same software application already installed on an electronic device. However, a new software application that is not installed on an electronic device is preferably installed without replacing existing software applications. As described above, new controlled information is preferably digitally signed, and the signed new controlled information is distributed to one or more locations from which it is retrieved for insertion onto electronic devices.

Any of several mechanisms for distribution of signed new controlled information to electronic devices are possible. When new controlled information is distributed to each controlled information insertion tool, for example, insertion tools are preferably configured to detect receipt of new controlled information, and to transfer the new controlled information to the mobile device 30 the next time the mobile device 30 is connected to the controlled information insertion tool. As described above, a controlled information insertion point 230 (FIG. 2), may be controlled by a user of an electronic device. Since many electronic devices are configured to be synchronized with computer systems, this type of controlled information distribution may be supported by implementing a controlled information insertion tool in a user's computer system. New controlled information is then inserted onto the electronic device the next time the electronic device is synchronized with the computer system.

Alternatively, new signed controlled information may be sent to a mobile devices through a wireless network, via the LAN 18, the WAN 12, and the wireless network gateway 16, as shown in FIG. 1, for example. Such signed controlled information could be sent to mobile devices either directly or through one or more controlled information insertion tools. Although the digital signature public key for an authorization level is preferably initially transferred to an electronic device such as the mobile device 30 through the interface/connectors 52 and 50, other communication links which cannot be physically secured or protected, such as wireless or public communication network links, may be used to subsequently transfer signed controlled information to an electronic device that is enabled for communications over such other links. When a digital signature public key for an authorization level has been inserted on a mobile device 30, then the insertion module 44 or the application loader 42 is able to verify both the integrity and the source identity of signed controlled information, whether it is received via the interface/connector 50 or the wireless transceiver 48. In this type of implementation, for example, a controlled information insertion tool may include a different type of interface to the mobile device 30 than the authorization information insertion tool 64.

Initial storage of controlled information, as well as replacement of existing controlled information, is thereby dependent upon verification of a digital signature by the insertion module 44 or the application loader 42. Those skilled in the art will appreciate that other checks may also be performed by an electronic device before existing information is replaced. In order to prevent replay attacks, in which old controlled information is resent by an attacker and received by the electronic device, controlled information preferably includes version information. Existing controlled information is replaced only where received controlled information is newer than the existing controlled information. Generally, newer controlled information has a higher version number.

Although authorization information is preferably inserted onto the mobile device 30 using the insertion tool 64 and the interface/connectors 50 and 52 as described above, updated authorization information may alternatively be transferred to the mobile device 30 via other communication paths. Authorization information is updated, for example, when the digital signature private/public key pair for an authorization level is changed. To this end, the insertion tool 64 may include other types of communication modules, such as a wireless transceiver or network connector, for example, that are less secure than the interface/connectors 50 and 52. Any such updates are dependent upon verification of a digital signature using a digital signature public key in existing authorization information.

When authorization information, as well as associated control settings if any, have been inserted onto the mobile device 30, control policies associated with any authorization levels created on the mobile device 30 are enforced. Control policy enforcement on the mobile device 30 is supported in the application loader 42, the insertion module 44, and an operating system executed by the processor 40. The application loader 42 controls software application installation, the insertion module 44 controls insertion of authorization information and controlled information, and the mobile device operating system controls other device operations, by checking control settings, for example, to ensure that operations are permitted. It is also contemplated that a software application or module that itself enforces control policies at an authorization level could be inserted onto an electronic device with authorization information. Where software application installation control is established by injecting such a software module along with authorization information, the application loader 42, or a control software module that operates in conjunction with the application loader 42, is inserted onto the mobile device 30 with authorization information associated with a software application installation authorization level.

The foregoing description relates primarily to writing authorization information and controlled information to memory on an electronic device such as the mobile device 30. However, an owner or authorized party may also wish to erase authorization information or controlled information, without replacing existing information with new information. In this case, since information is not being written to memory on a device, no signed authorization information or controlled information is sent to the device. Instead, an erase command or request is sent to the device. Erasure is a further function supported by the insertion module 44 in some implementations.

Referring again to FIG. 3, if authorization information or controlled information is to be erased from the authorization information store 36, then an erase command or request is digitally signed and sent to the insertion module 44. As with new authorization information or controlled information, a signed command or request could be sent to the mobile device 30 through either the interface/connector 50 or the wireless transceiver 48. For example, the insertion tool 64 could be adapted to erase existing authorization information from the mobile device 30 by providing an erase command generator or store which is also coupled to the interface/connector 52. Alternatively, authorization information erasure could be accomplished using a specialized erasure tool incorporating such an erase command generator or store and an interface to the mobile device 30. Erasure of controlled information is preferably controlled in a similar manner.

The insertion module 44, using the digital signature public key in existing authorization information on the mobile device 30, executes the command or completes the request if a digital signature is verified. In some instance, version verification also occurs prior to execution or completion. Otherwise, the command or request is preferably ignored, and an error or failure indication may be displayed to a user on a UI 46 on the mobile device 30, returned to a sending system or device that sent the command or request, or both. Further error or failure processing routines may then be performed at the sending system or device. From the foregoing description, it should be apparent that erasure, and any other supported authorization information and controlled information management functions, require a signature by a party authorized at a particular authorization level associated with the information being erased or managed, or at a higher authorization level where a hierarchical authorization level structure exists.

As shown in FIG. 3, other systems on the mobile device 30 have access to the memory 32. However, such device systems cannot insert, change, or erase authorization information or controlled information without submitting properly signed information or commands. Any data stores, such as the software application store 34, authorization information store 36, and the control settings store 38, that store authorization information or controlled information are therefore preferably located in protected memory areas, such as outside a file system used by other device systems. Only the insertion module 44 and the application loader 42 have write and erase access to these stores, such that digital signature-based control of insertion and erasure of authorization information and controlled information is maintained. Other device systems have read only access to authorization information and controlled information. In one embodiment, any systems or components through which the memory 32 is accessible are configured to allow memory read operations from any locations in the memory 32, but deny any write or erase operations to memory locations storing authorization information or controlled information unless the operations originate with or are authorized by the insertion module 44 or the application loader 42. In an alternative implementation, a memory manager (not shown) is provided to manage all memory access operations. Such a memory manager is configured to direct any write or erase operations involving authorization information or controlled information stores to the insertion module 44 or the application loader 42 for digital signature checking and authorization before completing the operations. Authorization information and controlled information may thereby be read by other device systems, but may only be inserted, changed, or erased when a digital signature is verified.

Figure 4:
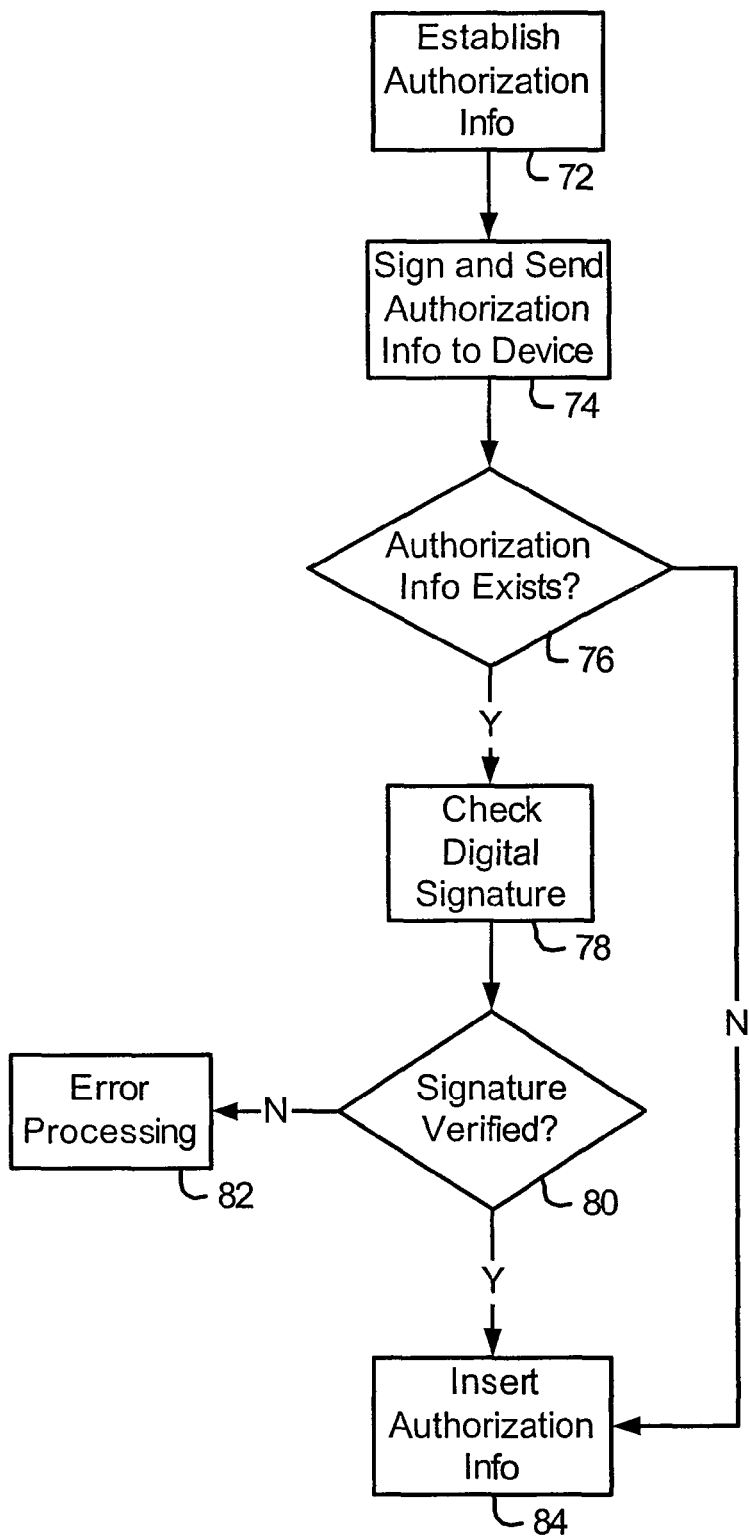
FIG. 4 is a flow diagram illustrating a method of inserting authorization information onto an electronic device.

FIG. 4 is a flow diagram illustrating a method of inserting authorization information onto an electronic device. The method in FIG. 4 begins at step 72, when authorization information for an authorization level is established. This involves such operations as generating or obtaining a digital signature private/public key pair for the authorization level, for example. The authorization information is then digitally signed (if prior authorization information exists) and sent to the electronic device at step 74.

At step 76, a determination is made as to whether authorization information for the same authorization level already exists on the electronic device, by checking an authorization information store, for example. Where authorization information does not exist on the electronic device, such as for an initial insertion of authorization information, the authorization information is inserted onto the electronic device at step 84, by storing the authorization information to a memory on the electronic device. When the authorization information is initially being inserted onto the electronic device, it need not necessarily be digitally signed. As described above, initial authorization information insertion is preferably performed directly by or at least under the authorization of a party authorized at the authorization level being created on the electronic device, such as an owner of the device.

A digital signature associated with the received authorization information is checked at step 78 where authorization information already exists on the electronic device. If the digital signature is not verified, as determined at step 80, the authorization information is not inserted onto the electronic device, and error processing is invoked at step 82. As described above, error processing may include such operations as indicating an error or failure on a UI of the electronic device and sending an error or failure message to an insertion tool or system from which the authorization information was sent. The authorization information is inserted onto the electronic device at step 84 where the digital signature was verified. Although not explicitly shown in FIG. 4, insertion of authorization information may also be dependent upon version or sequence information in the existing and received authorization information to prevent insertion of outdated authorization information via a replay attack. The method of FIG. 4 is repeated for each authorization level to be created on an electronic device.

After authorization information for an authorization level has been inserted on an electronic device, insertion of controlled information for that authorization level is restricted, as is evident from steps 76, 78, and 80. An organization implementing an electronic device control scheme therefore also implements measures to protect the confidentiality of information required to insert authorization information and controlled information onto its electronic devices, by controlling access to such confidential information, and possibly access to insertion tools used to insert authorization information and controlled information. For example, confidential Information such as a digital signature private key that is used by an authorized party to insert information for an authorization level is preferably known or accessible only to parties authorized at that authorization level. In the unlikely event that such information is obtained by an unauthorized party or lost by an authorized party, however, an electronic device control scheme may be compromised.

When an unauthorized party obtains a digital signature private key for an authorization level, for example, then that unauthorized party can potentially insert its own controlled information onto electronic devices. In this situation, a party authorized at the authorization level preferably generates or obtains a new digital signature public/private key pair to replace the existing key pair, establishes new authorization information including the new public key for the authorization level, digitally signs the new authorization information using the existing private key, and inserts the new authorization information onto each electronic device supporting that authorization level. As a precautionary measure, new controlled information is then also preferably inserted onto each such electronic device to replace any controlled information that might have been inserted by the unauthorized party.

With the digital signature private key, an unauthorized party can also insert its own authorization information, including a digital signature public key corresponding to its own private key, for an authorization level. This prevents an authorized party from inserting new authorization information as described above, since the digital signature on the new authorization information cannot be verified using the public key inserted by the unauthorized party. A similar situation arises when authorized parties lose a digital signature private key. In these cases, a hierarchical authorization level structure is desirable in that compromise of a lower authorization level is rectified through a higher authorization level. In one embodiment, a master authorization level is created on every electronic device in an organization. This may be performed, for example, by a device manufacturer inserting a digital signature public key onto an electronic device. This key might be generated by or provided to a device owner or an entity trusted by the device owner, or retained by the device manufacturer to allow the device manufacturer to assist in recovery operations after confidential information has been compromised. Retention of such a key by the device manufacturer or a trusted entity outside the owner's company or organization provides for electronic device control recovery even if confidential information for every other authorization level on an electronic device is lost or obtained by an unauthorized party. Since confidential information for the master authorization level is maintained separately, at the manufacturer or external trusted entity premises, confidential information required for the master authorization level remains secure, and can then be used to re-establish authorization levels and device control by inserting new authorization information onto each electronic device.

According to another embodiment, targeted recovery operations are performed. When confidential information for an authorization level is lost but has not been obtained by an unauthorized party, device control remains effective. However, new authorization information or controlled information for that authorization level cannot be inserted onto electronic devices, even by a party authorized at that level.

Although confidential information for the authorization level has been lost, the existing authorization information for the same authorization level may still be available. By providing both new authorization information and the existing authorization information to a party authorized at a higher authorization level, the new authorization information signed by the higher authorized party is inserted only onto those devices on which the existing authorization information is stored. In this instance, the signed new authorization information could be sent to all of an owner's electronic devices, but is inserted onto each electronic device only if the existing authorization is found. This functionality is enabled, for example, by sending a software application that searches for the existing authorization information, along with the new authorization information. If required under current device control policies, the software application may also be signed. Targeted recovery inserts new authorization information for an authorization level only onto devices on which the authorization level was previously created. This recovery mechanism is also effective when confidential information has been obtained by an unauthorized party, provided authorized information has not yet been changed by the unauthorized party.

In reference to FIG. 4, a negative determination is made at step 80 when new authorization information, signed using a digital signature private key corresponding to a digital signature public key that has been replaced by an unauthorized party or a key associated with a higher authorization level, is received at an electronic device. However, if the error processing at step 82 includes repeating steps 78 and 80 using authorization information for each higher authorization level, then device control is eventually recovered by inserting new authorization information, signed using a private key associated with a higher authorization level, onto electronic devices. A master authorization level for which confidential information, such as a digital signature private key is maintained separately from confidential information for other authorization levels, thus provides a further mechanism for device control recovery when security of authorization levels are breached.

Although this recovery mechanism involves intervention by the device manufacturer or the trusted entity, it avoids alternative recovery operations, such as reprogramming or rebuilding each electronic device, that are more costly and inconvenient for both the owner and the manufacturer or trusted party. The manufacturer or the trusted entity need only digitally sign new authorization information that is to be inserted onto the electronic devices where a master authorization level is supported.

Figure 5:
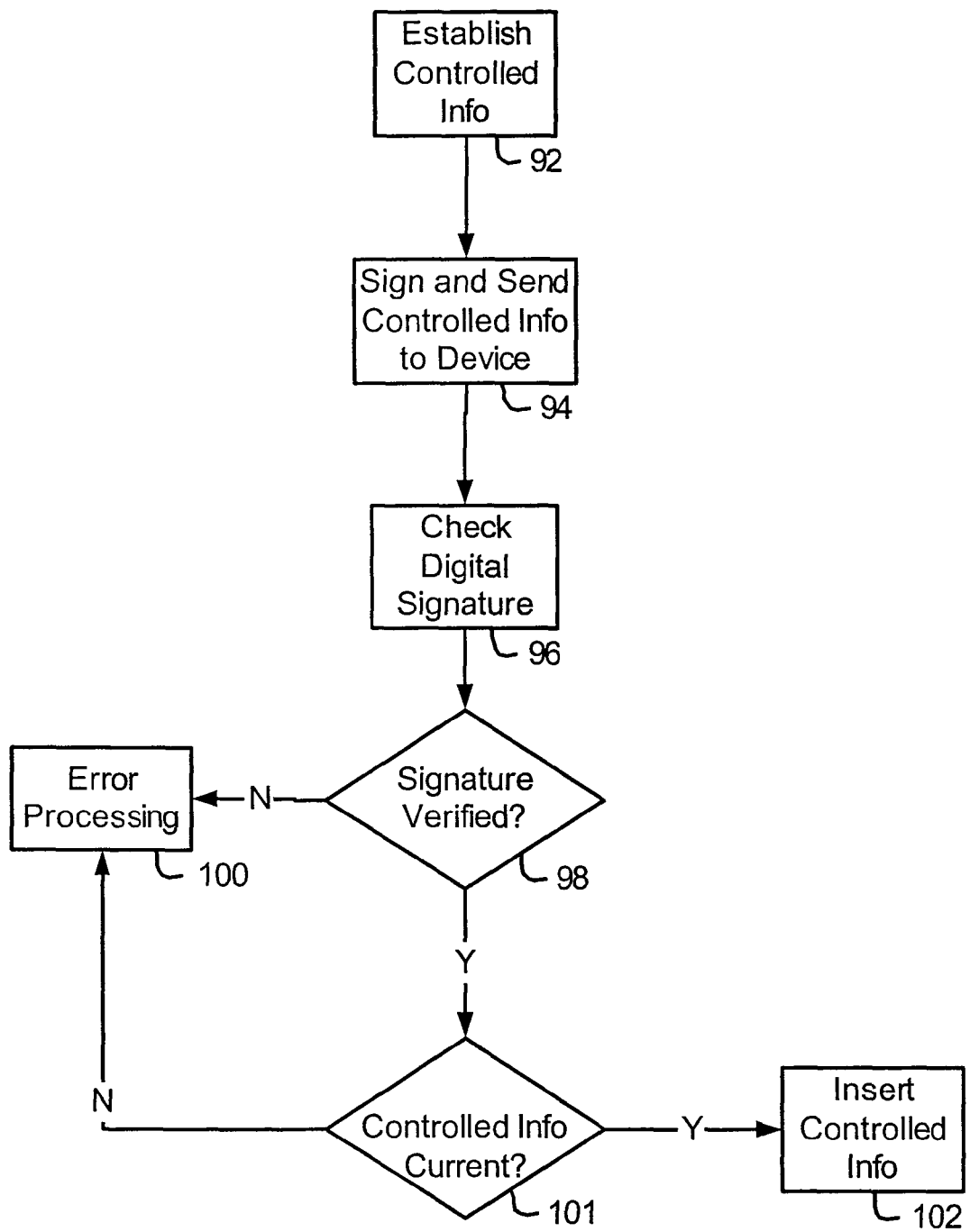
FIG. 5 is a flow diagram illustrating a method of inserting controlled information onto an electronic device.

Initial insertion of authorization information creates an authorization level on an electronic device and restricts subsequent insertion of controlled information for that authorization level onto the electronic device. FIG. 5 is a flow diagram illustrating a method of inserting controlled information onto an electronic device.

At step 92, controlled information is established, based on how an electronic device is to be controlled. Controlled information, as described above, may include control settings, a software application, or other information affecting the operation of an electronic device. The controlled information is then signed and sent to the electronic device at step 94. The digital signature on the controlled information is then checked at step 96. At step 98, it is determined whether the digital signature is verified based on authorization information for the corresponding authorization level. Error processing, which may involve operations similar to those described above in conjunction with step 82 in FIG. 4, is performed at step 100 where the digital signature is not verified. If authorization information including a digital signature key has not been previously inserted onto the electronic device, or the controlled information was not signed using a digital signature key corresponding to the digital signature key inserted onto the electronic device for the authorization level associated with the controlled information, then the digital signature is not verified at step 98.

Where the digital signature is verified at step 98, it is then determined at step 101 whether the received controlled information is current, such as by determining whether a version number of the received controlled information is greater than the version number of existing controlled information. The received controlled information is inserted onto the electronic device at step 102 where the digital signature was verified and the received controlled information is current. Step 102 entails storing the controlled information to an appropriate data store on the electronic device, and possibly performing installation procedures where the controlled information is a software application, for example. Otherwise, error processing is performed at step 100.

If the controlled information is a software application, an authorization level that controls software application installation controls operation of an electronic device by restricting the insertion of controlled information, and thus the particular software applications that are installed on the device. In the case of control settings however, the controlled information itself, once inserted, controls the electronic device.

Figure 6:
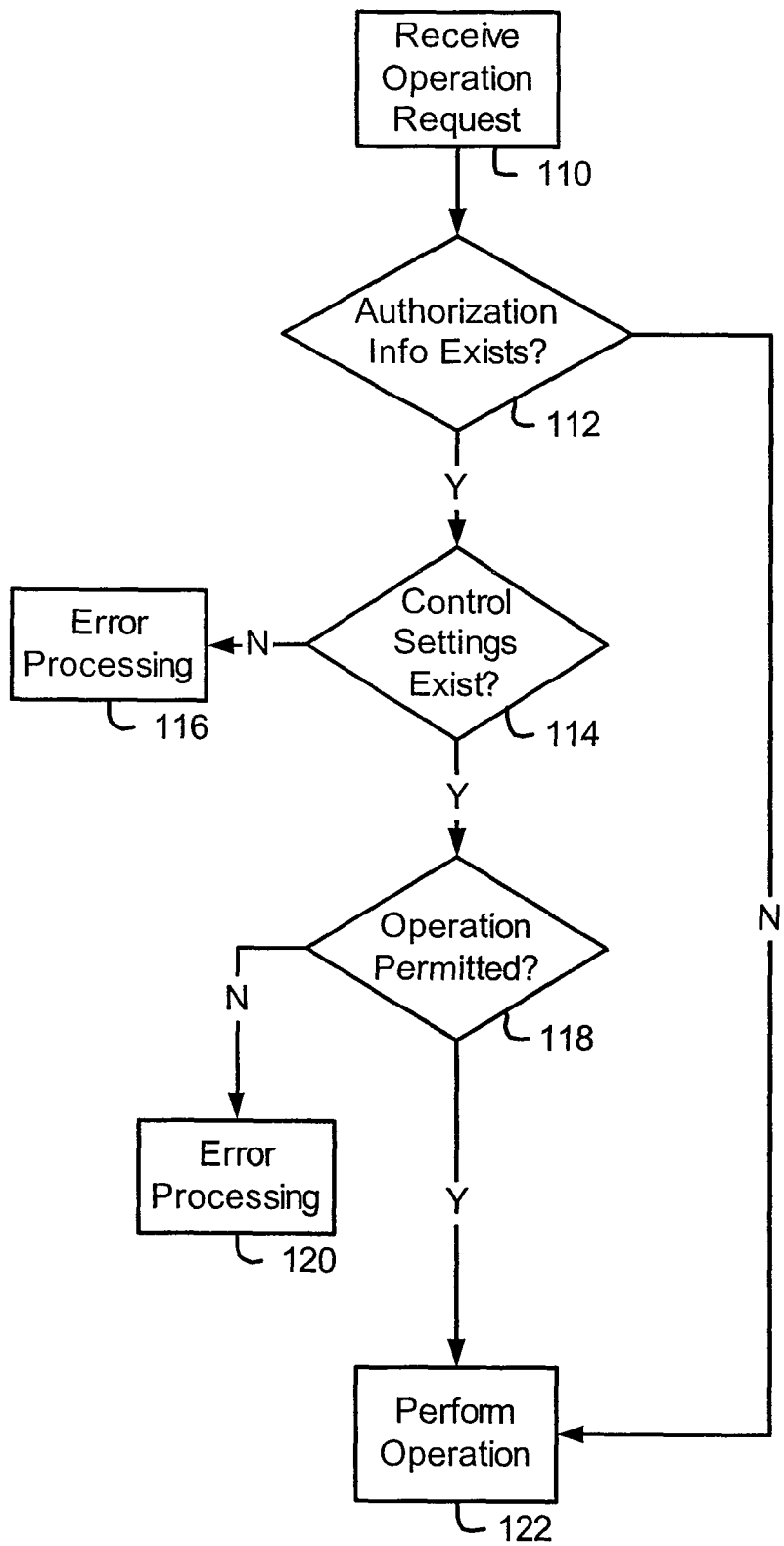
FIG. 6 is a flow diagram showing a method of controlling an electronic device.

FIG. 6 is a flow diagram showing a method of controlling an electronic device. The method in FIG. 6 is an illustrative example of electronic device control based on control settings. As described above, not every authorization level has associated control settings.

At step 110, an operation request is received at the electronic device. Operation requests include, for example, a function call from a software application executing on the electronic device, an attempt by a user, a software application, or a system on the electronic device to perform an operation, and the like. Where software application installation is controlled using control settings that specify a list of approved software applications, instead of the insertion-based installation control described above in conjunction with FIG. 5, operation requests also include receipt of a software application for installation. Such requests originate with a user, a software application, a device system, or possibly a remote system or device. If authorization information relevant to the operation request does not exist on the electronic device, as determined at step 112, then no authorization level has been established for that operation, and the operation is performed at step 122. In the example of a received software application, step 122 involves installation of the software application on the electronic device.

In an alternative embodiment, the default action upon a negative determination at step 112 is to revert to error processing. An electronic device configured in this manner is inoperable, or has only limited functionality, until an authorization level is created on the device. This type of configuration is preferred where an owner provides electronic devices to employees before authorization information is inserted.

Where authorization information exists, it is determined at step 114 whether associated control settings also exist. Error processing operations, such as presenting an error message to a user of the electronic device and returning an error indication to a source from which the operation request was received, are performed at step 116 if authorization information exists, but control settings do not exist. This situation occurs, for example, when authorization information has been inserted onto an electronic device to create an authorization level associated with the operation, but control settings have not yet been inserted. In this case, the existence of authorization information on the electronic device indicates that some level of control over the operation is intended, even though control settings have not yet been inserted. The operations of determining whether control settings exist at step 112 and then reverting to error processing at step 116 where control settings do not exist prevents execution of controlled operations after an authorization level has been created, but before control settings have been inserted.

Alternatively, default action in response to a negative determination at step 114 could be to revert to step 122, where an owner or authorized party, at its discretion, does not wish to restrict device operations before control settings are inserted. This type of default action is useful when an authorization level was created to support future control settings that have not yet been established or distributed.

Some types of requested operations might also be partially completed as a default action. A received software application, for example, could be stored on an electronic device in such a way that it is not executable, and then checked against an allowed software application list when control settings are subsequently inserted onto the electronic device. Although software applications are stored on an electronic device in this embodiment, they are not usable until control settings are inserted onto the electronic device, and it is confirmed that the software applications are authorized for installation. The amount of memory space made available for such software application storage is preferably limited, so that available memory space is not depleted by storing unchecked and possibly unauthorized software applications. In another embodiment, received software applications are installed, checked against control settings when control settings are inserted, and then removed if not allowed. Such checking of existing software applications and possibly other electronic device components or configuration settings when control settings are inserted is also useful following device control recovery. Unauthorized functions, configuration settings, and software applications that were enabled or installed by an unauthorized party or before authorization information or controlled information inserted by such a party was replaced, for example, are then disabled, reset, or removed unless they comply with new authorization information and controlled information.

When both authorization information and control settings have been inserted onto an electronic device, it is determined at step 118 whether the operation is permitted. In the case of a received software application and control settings specifying approved software applications, step 118 involves determining whether the software application is one of the approved software applications. The requested operation is performed at step 122 where the operation is permitted. Otherwise, error processing is performed at step 120.

As described above, control settings may include not only permissions and restrictions for electronic device operations and software applications, but also a list of required software applications or modules which may be checked from time to time to ensure that all required software applications are present on an electronic device. For example, an electronic device may be configured to check for required software applications at step 118 when certain types of operation request are received, and to perform the operation at step 122 only when all required software applications are found. This functionality permits a corporate owner to prevent operations to access corporate messaging services or data if a secure communication software application or utility is not installed on an electronic device, for instance.

The method shown in FIG. 6 and described above applies to authorization levels having associated control settings. For authorization levels having no control settings, such as an authorization level providing digital signature-based control of software application installation, operations are controlled substantially as shown in FIG. 5. That is, operations are permitted or denied based on authorization information for a particular authorization level. Commands or requests to write data to or erase data from an authorization information store, a controlled information store, or a software application store are also preferably controlled in this manner, although permissions and restrictions for such commands or requests could instead be specified in control settings.

It will be appreciated that the above description relates to preferred embodiments by way of example only. Many variations on the systems and methods described above will be obvious to those knowledgeable in the field, and such obvious variations are within the scope of the application as described, whether or not expressly described herein.

For example, insertion of authorization information and controlled information may be secured by other than public key digital signature schemes, or by other means than digital signatures. Instead of checking digital signatures on authorization information, controlled information, and restricted commands or requests, an electronic device might issue a cryptographic challenge using a previously inserted cryptographic key associated with an owner of the electronic device. The cryptographic key could be a public key of the owner or a secret key shared between the owner and the electronic device. Operations such as authorization information insertion or controlled information insertion or erasure would then be performed when a valid challenge response is returned. As those skilled in the art will appreciate, a valid challenge response can only be generated using a corresponding cryptographic key. Data integrity and source authentication could instead be assumed, for example, where authentication information or controlled information are sent to an electronic device over a secure channel. If the device properly decrypts information received via the secure channel, then it is assumed that the information is valid and was sent by an authorized party. In this latter scheme, the source and device share a public/private key pair, or a common symmetric key.

When software application installation is controlled on the basis of control settings that include an authorized software application list, for example, the list is searched to determine whether a received software application is one of the authorized software applications. Such a search is performed by the application loader 42 in FIG. 3 and embodied at step 118 in FIG. 6. An authorized software application list preferably includes information which uniquely identifies the authorized software applications, such as a hash of the software application source code or executable code, for example. Since a software application developer is free to choose a file name for any software application, file names do not provide a reliable authorization check. However, if a party authorized at the authorization level associated with software application installation control generates a hash of each authorized software application and includes the hash in the control settings inserted onto an electronic device, then only particular versions of authorized software applications can be installed on the electronic device. A hash of any received software application is generated, and the received software application is installed only if the generated hash matches a hash in the control settings. In order to support different hashing algorithms on different electronic devices, more than one hash of each software application may be included in the control settings. Any of a number of different hashing algorithms is then used to generate a hash of a received software application. Other unique transformations than hashes could also be used to generate controlled information and to determine whether received software applications are authorized for installation.

Control settings may also specify a list of required software applications, uniquely identifying mandatory software applications that must be installed on an electronic device. A required software application list allows an authorized party to ensure that every electronic device under their control supports certain core functions, such as electronic messaging and secure communications, for example. Software applications in a required software application list may be uniquely identified by one or more hashes, as described above in the context of authorized applications. In the mobile device 30 (FIG. 3), the processor 40, the application loader 42, the insertion module 44, or a further device component or system is configured to periodically check to ensure that each required software application is present, and that a hash of each required software application matches a hash in the required software application list. Where a required software application is not present on the mobile device 30 or its hash does not match a hash in the required software application list, which occurs when a software application has been changed, the mobile device 30, or at least some of its functions, is rendered unusable.

Figure 7:
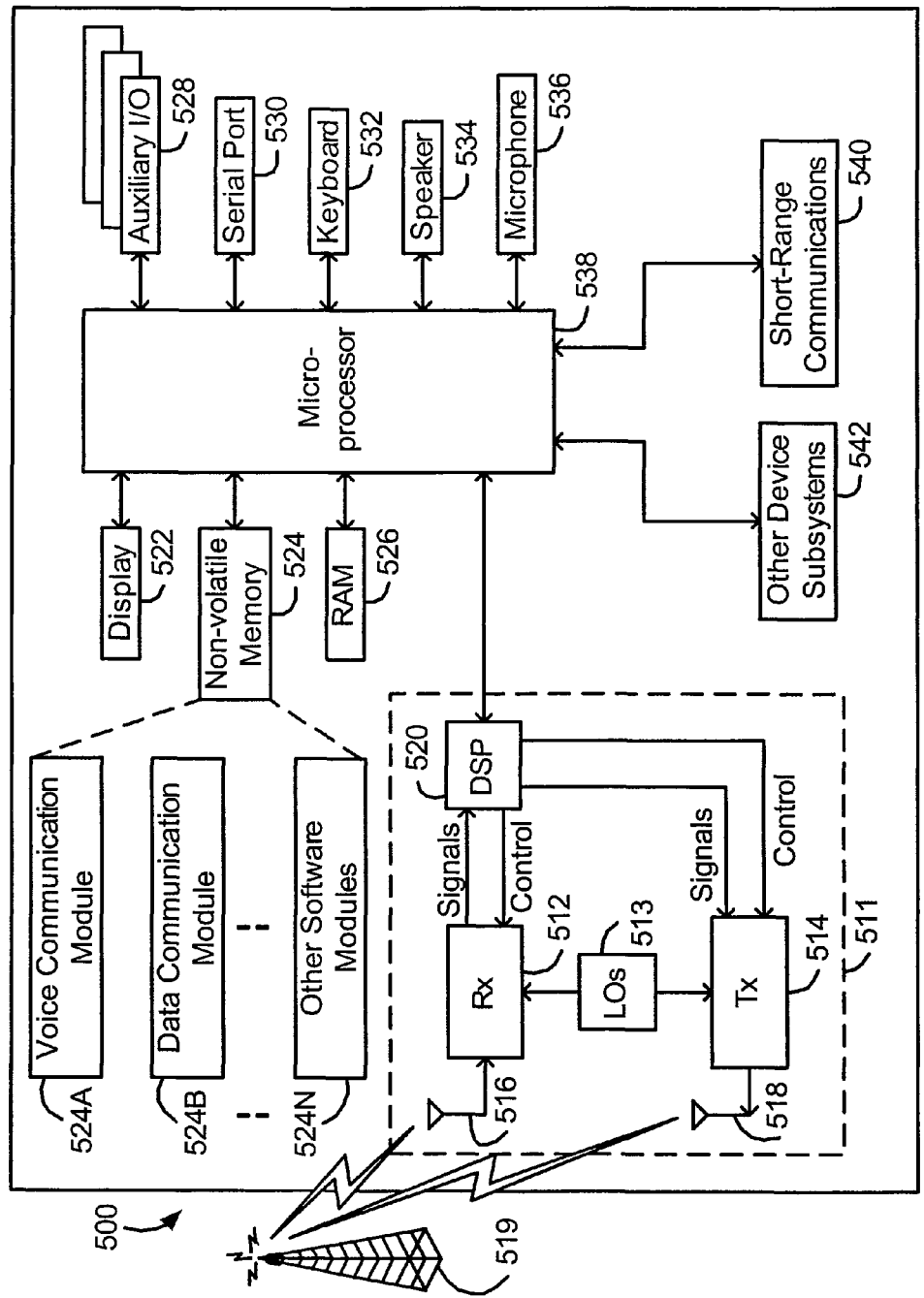
FIG. 7 is a block diagram of a wireless mobile communication device as an example of an electronic device.

In addition, an electronic device in which systems and methods described above are implemented may include fewer, further, or additional components than shown in FIGS. 2 and 3. FIG. 7 is a block diagram of a mobile device as an example of such an electronic device.

The mobile device 500 is preferably a two-way communication device having at least voice and data communication capabilities, and preferably also has the capability to communicate with other computer systems on the Internet. Depending on the functionality provided by the mobile device, the mobile device may be referred to as a data messaging device, a two-way pager, a mobile telephone with data messaging capabilities, a wireless Internet appliance, or a data communication device (with or without telephony capabilities). As mentioned above, such devices are referred to generally herein simply as mobile devices.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and other device sub-systems 542. The transceiver 511 includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 7 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 7, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which performs such functions as signal amplification, frequency down conversion, filtering, channel selection, and analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, RAM 526, auxiliary I/O devices 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536. Such interfaces are designated generally as UI 46 in FIG. 3.

Some of the subsystems shown in FIG. 7 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 may also include data stores for authorization information and controlled information. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to insert authorization information and controlled information onto the mobile device 500 and to download other application modules 524N for installation on the mobile device 500. This wired download path may further be used to load an encryption key onto the mobile device 500 for use in secure communications, which is a more secure method than exchanging encryption information via the wireless network 519.

Authorization information, controlled information, and additional application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and provides enhanced on-device functions, communication-related functions, or both. For example, secure communication applications enable electronic commerce functions and other such financial transactions to be performed using the mobile device 500.

When the mobile device 500 is operating in a data communication mode, a received signal, such as a text message or a web page download, is processed by the transceiver 511 and provided to the microprocessor 538, which preferably further processes the received signal for output to the display 522, or, alternatively, to an auxiliary I/O device 528. Authorization information, controlled information, and commands or requests related to authorization information or controlled information that are received by the transceiver 511 are processed as described above. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511.

When the mobile device 500 is operating in a voice communication mode, the overall operation of the mobile device 500 is substantially similar to the data mode, except that received signals are output to the speaker 534 and voice signals for transmission are generated by a microphone 536. In addition, the secure messaging techniques described above might not necessarily be applied to voice communications. Alternative voice or audio I/O devices, such as a voice message recording subsystem, may also be implemented on the mobile device 500. Although voice or audio signal output is accomplished through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also included in the mobile device 500. For example, the subsystem 540 may include an infrared device and associated circuits and components, or a Bluetooth or 802.11 short-range wireless communication module to provide for communication with similarly-enabled systems and devices. Thus, authorization information insertion and controlled information insertion as described above may be enabled on the mobile device 500 via the serial port 530 or other short-range communications subsystem 540.

FIG. 7 represents a specific example of an electronic device in which device control systems and methods described above may be implemented. Implementation of such systems and methods in other electronic devices having further, fewer, or different components than those shown in FIG. 7 would be obvious to one skilled in the art to which this application pertains and are therefore considered to be within the scope of the present application. For example, although a SIM card has not been explicitly shown in FIG. 7, it should be appreciated that implementation of control systems and methods in electronic devices with SIM cards is contemplated. Since SIM cards currently incorporate a memory component, authorization information, controlled information, or both, may be inserted onto a SIM card, either before the SIM card is provided for use in an electronic device. Thereafter, any electronic device in which the SIM card is installed is controlled as described above.

Also, the systems' and methods' data may be stored as one or more data structures in computer memory and/or storage depending upon the situation at hand. The systems and methods may also have their data and software transmitted on data signals (e.g., packetized data signals) or via carrier signals (e.g., radio frequency carrier signals) or other communication pathways (e.g., fiber optics, infrared, etc.).

What is claimed is:

1. A mobile wireless device comprising:
a microprocessor and memory, the memory comprising a set of control settings used to control a plurality of device operations;

wherein the microprocessor is configured to:
receive a first digital signature key for verifying digital signatures on software applications to be installed on the device;
determine if any digital signature keys for verifying digital signatures on software applications to be installed on the device exist on the device, and if not, store the received first digital signature key in the memory;
receive a software application for installation on the device;
verify a digital signature on the received software application using the first digital signature key; and
install the software application on the device if the digital signature on the received software application is successfully verified;
receive a new digital signature key for verifying digital signatures on software applications to be installed on the device;
verify a digital signature on the received new digital signature key using the first digital signature key; and
store the new digital signature key in the memory to replace the first digital signature key if the digital signature on the received new digital signature key is successfully verified.

2. The device of claim 1, further comprising a second digital signature key stored in the memory, where the second digital signature key is different from the first digital signature key and where the second digital signature key is useable for verifying the authenticity of the control settings used to control a plurality of device operations.

3. The device of claim 1, wherein the microprocessor is configured to receive the new digital signature key wirelessly, via an interface on the device.

4. The device of claim 1, wherein the microprocessor is further configured to:
receive a targeted recovery application that searches for the first digital signature key, and a new digital signature key; and
execute the targeted recovery application that searches for the first digital signature key, wherein the first digital signature key is replaced with the new digital signature key if the first digital signature key is found.

5. The device of claim 4, wherein the microprocessor is configured to receive the targeted recovery application that searches for the first digital signature key wirelessly, via an interface on the device.

6. The device of claim 4, wherein a device manufacturer key is stored on the device, and wherein the microprocessor is further configured to:
verify a digital signature on the received targeted recovery application that searches for the first digital signature key using the device manufacturer key; and
perform execution of the targeted recovery application that searches for the first digital signature key only if the digital signature on the received targeted recovery application that searches for the first digital signature key is successfully verified.

7. The device of claim 1, wherein the microprocessor is configured to receive at least one of the first digital signature key and the software application wirelessly, via an interface on the device.

8. The device of claim 1, wherein the microprocessor is configured to:
determine whether the received software application is current by comparing a version number of the received software application to a version number of a previously installed software application;

wherein the received software application is installed if the digital signature on the received software application is successfully verified and if the received software application is determined to be current.

9. The device of claim 1, wherein installations of software applications on the device are prevented until the first digital signature key is stored in the memory.

10. A method of controlling a mobile wireless device that comprises a microprocessor and memory, wherein the method comprises:

receiving a first digital signature key for verifying digital signatures on software applications to be installed on the device;

determining if any digital signature keys for verifying digital signatures on software applications to be installed on the device exist on the device, and if not, storing the received first digital signature key in the memory;

receiving a software application for installation on the device;

verifying a digital signature on the received software application using the first digital signature key; and installing the software application on the device if the digital signature on the received software application is successfully verified;

receiving a new digital signature key for verifying digital signatures on software applications to be installed on the device;

verifying a digital signature on the received new digital signature key using the first digital signature key; and storing the new digital signature key in the memory to replace the first digital signature key if the digital signature on the received new digital signature key is successfully verified.

11. The method of claim 10, wherein a second digital signature key is stored in the memory, wherein the second digital signature key is different from the first digital signature key, and wherein the second digital signature key is for verifying digital signatures on information other than software applications being inserted onto the device.

12. The method of claim 10, further comprising receiving the new digital signature key wirelessly, via an interface on the device.

13. The method of claim 10, further comprising:

receiving a targeted recovery application that searches for the first digital signature key, and a new digital signature key; and executing the targeted recovery application that searches for the first digital signature key, wherein the first digital signature key is replaced with the new digital signature key if the first digital signature key is found.

14. The method of claim 13, further comprising receiving the targeted recovery application that searches for the first digital signature key wirelessly, via an interface on the device.

15. The method of claim 13, wherein a device manufacturer key is stored on the device, and wherein the method further comprises:

verifying a digital signature on the received targeted recovery application that searches for the first digital signature key using the device manufacturer key; and executing the targeted recovery application that searches for the first digital signature key only if the digital signature on the received targeted recovery application that searches for the first digital signature key is successfully verified.

16. The method of claim 10, further comprising receiving at least one of the first digital signature key and the software application wirelessly, via an interface on the device.

17. The method of claim 10, further comprising:

determining whether the received software application is current by comparing a version number of the received software application to a version number of a previously installed software application;

wherein the received software application is installed if the digital signature on the received software application is successfully verified and if the received software application is determined to be current.

18. The method of claim 10, wherein installations of software applications on the device are prevented until the first digital signature key is stored in the memory.

19. A non-transitory computer-readable medium storing instructions executable by a microprocessor which when executed cause the processor to carry out a method comprising:

receiving a first digital signature key for verifying digital signatures on software applications to be installed on the device;

determining if any digital signature keys for verifying digital signatures on software applications to be installed on the device exist on the device, and if not, storing the received first digital signature key in the memory;

receiving a software application for installation on the device;

verifying a digital signature on the received software application using the first digital signature key; and installing the software application on the device if the digital signature on the received software application is successfully verified;

receiving a new digital signature key for verifying digital signatures on software applications to be installed on the device;

verifying a digital signature on the received new digital signature key using the first digital signature key; and storing the new digital signature key in the memory to replace the first digital signature key if the digital signature on the received new digital signature key is successfully verified.

* * * * *

UNITED STATES PATENT AND TRADEMARK OFFICE
CERTIFICATE OF CORRECTION

PATENT NO.        : 8,429,410 B2
APPLICATION NO.   : 12/829555
DATED             : April 23, 2013
INVENTOR(S)       : Herbert Anthony Little et al.

It is certified that error appears in the above-identified patent and that said Letters Patent is hereby corrected as shown below:

Title page, item (62), related U.S. Application Data "Division" should read --Continuation--.

Signed and Sealed this
Sixteenth Day of July, 2013

Teresa Stanek Rea
*Acting Director of the United States Patent and Trademark Office*